(12) United States Patent
Ono et al.

(10) Patent No.: US 6,210,091 B1
(45) Date of Patent: Apr. 3, 2001

(54) LOCK NUT

(75) Inventors: Rikio Ono; Shigenobu Takata; Keiji Matsuda, all of Kurashiki (JP)

(73) Assignee: Kawasaki Steel Corporation, Kobe (JP)

( * ) Notice: Subject to any disclaimer, the term of this patent is extended or adjusted under 35 U.S.C. 154(b) by 0 days.

(21) Appl. No.: 09/425,955

(22) Filed: Oct. 25, 1999

(30) Foreign Application Priority Data

Mar. 25, 1999 (JP) .................................................. 11-080753

(51) Int. Cl.$^7$ .............................. F16B 37/08; F16B 39/34
(52) U.S. Cl. .......................... 411/303; 411/263; 411/324; 411/432
(58) Field of Search .................................... 411/237, 238, 411/303, 304, 263, 324, 432

(56) References Cited

U.S. PATENT DOCUMENTS

| | | | | |
|---|---|---|---|---|
| 1,275,182 | * | 8/1918 | Ross | 411/238 |
| 1,667,751 | * | 5/1928 | Tarwater | 411/238 |
| 2,318,398 | * | 5/1943 | Hungerford | 411/263 |
| 2,815,788 | * | 12/1957 | Tarwater | 411/238 |
| 5,752,793 | * | 5/1998 | Wu | 411/303 |

FOREIGN PATENT DOCUMENTS

| | | | | |
|---|---|---|---|---|
| 708905 | * | 5/1931 | (FR) | 411/238 |
| 3-526 | | 1/1991 | (JP) . | |

* cited by examiner

*Primary Examiner*—Neill Wilson
(74) *Attorney, Agent, or Firm*—Oliff & Berridge, PLC

(57) ABSTRACT

A lock nut for engagement with a thread of a bolt, in which a thread block is arranged in the body thereof for engaging with the thread of the bolt and is made eccentric with respect to the axis of the nut body so that an initial tightening force of the nut on the bolt can be held for a long time.

8 Claims, 5 Drawing Sheets

PERIPHERAL POSITION OF WASHER 6

BEARING PRESSURE DISTRIBUTIONS

BEARING PRESSURE DISTRIBUTIONS

LOCK NUT

BACKGROUND OF THE INVENTION

1. Field of the Invention

The present invention relates to a lock nut to be employed for fastening articles by tightening it on a bolt and is intended to hold the applied tightening force for a long time by devising the inside of the nut.

2. Description of the Related Art

In the prior art, the means for preventing the nut from becoming loose has been disclosed in Examined Published Japanese Patent Application No. 3-526, for example. Here a lower nut is used, in which a convex taper block is formed on the upper face thereof with an eccentricity relative to the axis of a thread, and an upper nut in which a recess concentric to the axis of the thread is formed to be fitted on the convex portion of the taper block. The nut is locked by a wedge effect at the taper portion by first tightening the lower nut on the bolt in an ordinary manner and then by tightening the upper nut.

This nut requires tightening twice because of the double type. When the tightening requires a torque wrench, the upper and lower nuts are simultaneously tightened so that the locking effect cannot be expected as a matter of fact. On the other hand, when the nut is to be removed, the thread portion may be broken when the loosening operation starts from the lower nut.

SUMMARY OF THE INVENTION

An object of the invention is to provide a lock nut which is simple to tighten while also maintaining a strong locking effect.

According to a first aspect of the invention, there is provided a lock nut for engaging with the thread of a bolt, comprising at least one thread block disposed in the body thereof that engages with the thread of the bolt and made eccentric with respect to the axis of the nut body.

According to another aspect of the invention, the eccentric thread block is contoured to have the same polygonal shape as that of a polygonal recess formed in the upper portion of the nut body and is confined in the polygonal recess.

According to still another aspect of the invention, a retaining portion is formed at the head portion of the nut body for retaining the eccentric thread block.

According to a further aspect of the invention, a clearance is formed between the retaining portion formed at the head portion of the nut body and the eccentric thread block for adjusting the gap between the thread crests of the nut body and the thread crests of the eccentric thread block.

According to a further aspect of the invention, a chamfer is formed at the bolt insertion end of the eccentric thread block.

According to a further aspect of the invention, a washer is arranged below the nut body.

According to a further aspect of the invention, a washer portion is formed integrally with the lower end portion of the nut body.

DESCRIPTION OF THE PREFERRED EMBODIMENTS

In the lock nut, according to the invention, there is arranged the eccentric thread block which rotates together with the nut. As a result, a force perpendicular to the axis of the bolt is applied to the bolt portion at which the eccentric thread block is positioned when the lock nut is tightened, so that the nut does not easily become loose.

The eccentricity of the eccentric thread block can be properly set depending upon the size or the like of the nut. The eccentric thread block is arranged in the lock nut by forming a retaining portion for preventing the block from coming out and a recess, by inserting the eccentric thread block into the recess and then by tilting the retaining portion. The lock nut to be used can conform to the JIS (Japanese Industrial Standards, e.g., JIS 1181 or the like for a hexagonal nut). In the invention, the eccentric thread block is arranged in the lock nut so that the external diameter size of the nut to be used can conveniently have a size one rank larger than that of the ordinary one matching the bolt size.

Figure 1:
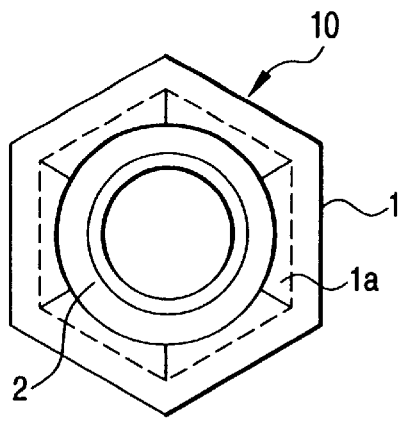
FIGS. 1A and 1B are a top plan view and a sectional view showing a construction of a nut according to the invention.
FIG. 1C is a sectional view of an eccentric thread block.
Figure 1:
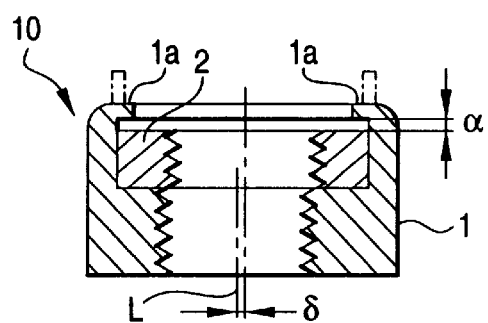
Figure 1:
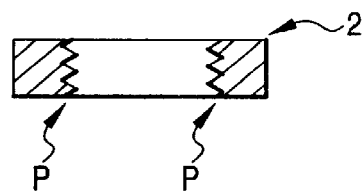

In FIG. 1, reference numeral 1 designates a nut body having a retaining portion 1a tilted as shown at its head portion, and it is brought into engagement with the thread of a bolt. Numeral 2 designates an eccentric thread block having an axis made eccentric by $\delta$ with respect to the axis L of the nut body. This eccentric thread block 2 is preferably chamfered P at an angle of about 45 degrees so that it may not interfere with the leading end of the bolt at the entrance side end of the bolt.

In order that the eccentric thread block 2 thus constructed may be confined in the nut body 1, it is inserted into the recess of the nut body 1 while its retaining portion 1a a is being inverted in advance (as indicated by phantom lines in FIG. 1B), and the retaining portion 1a is then tilted.

When the eccentric thread block 2 is to be inserted into the recess, a clearance $\alpha$ is formed to adjust the discrepancy in the thread pitch between the thread of the nut body 1 and the thread of the eccentric thread block 2. The clearance $\alpha$ may preferably have a value equivalent to the pitch size of the nut body 1. The eccentric thread block 2 is contoured to have a polygonal shape such as a square or a hexagon like that of the nut so that a turning force may be applied to the eccentric thread block 2 when the nut is tightened. The case of a regular hexagon is exemplified in the Drawing.

Figure 2:
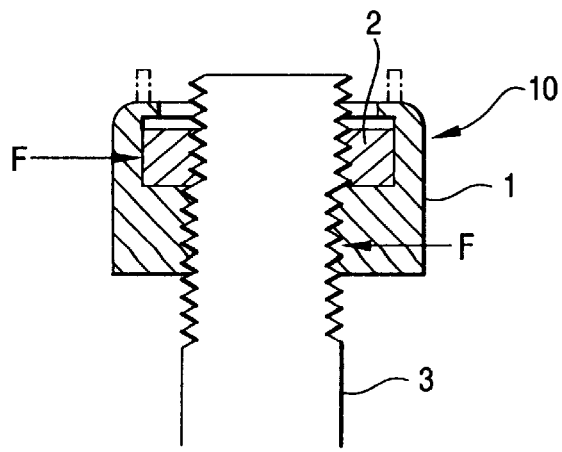
FIG. 2 is a sectional view showing a state in which the nut according to the invention is tightened on the bolt.

As the lock nut 10 thus constructed is tightened into a bolt 3, a force F, as shown perpendicular to the axis of the bolt 3 in FIG. 2, acts on the nut to prevent it from easily getting loose. Since the eccentric thread block 2 is turned integrally with the nut body 1, on the other hand, there arises no problem even when a torque wrench is used, for example. The tightening can be performed in a prescribed torque while ensuring the effect to lock the nut.

Figure 3:
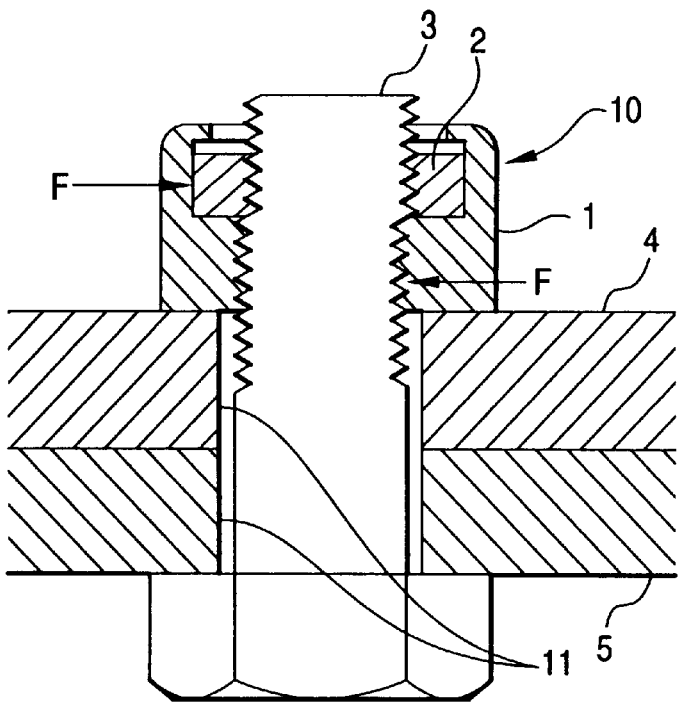
FIG. 3 is a sectional view showing a state in which the nut according to the invention is tightened on the bolt to fasten members to be fastened.

When a plurality of parts are to be fastened, as shown in FIG. 3, two members 4 and 5 to be fastened are fastened in the locked state by overlaying them, by inserting the bolt 3 into bolt holes 11 formed in the fastened portions of the members 4 and 5, and by tightening the lock nut 10 of the invention onto the leading end portion of the bolt 3. When the members 4 and 5 are fastened by the prescribed tightening force, the area for the nut body 1 constructing the lock nut 10 to contact with the member 4 is sized to relax a bearing pressure so that the nut body 1 may not buckle and depress the member 4 due to a plastic deformation.

Figure 4:
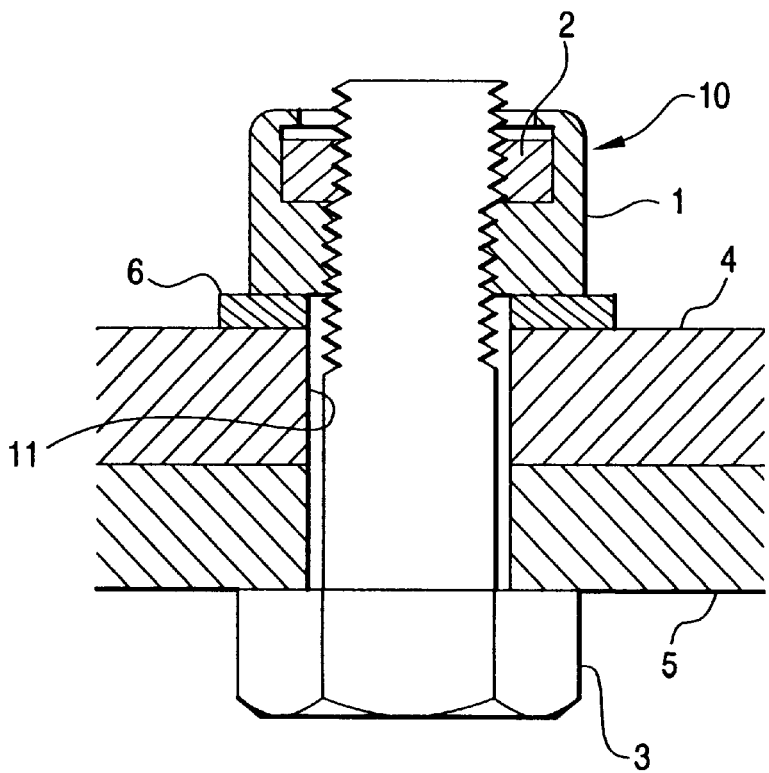
FIG. 4 is a sectional view showing a state in which the nut according to the invention is tightened on the bolt through a washer to fasten the members.
Figure 5:
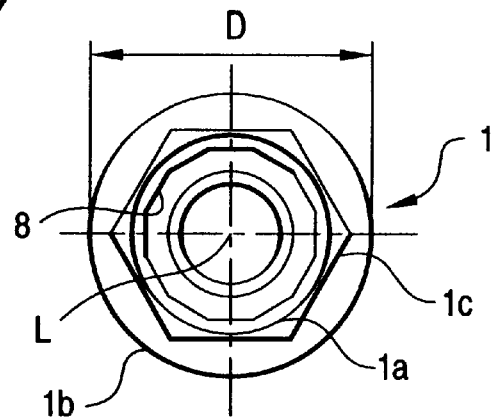
FIGS. 5A and 5B are a top plan view and a sectional view showing a construction of another nut body according to the invention.
Figure 5:
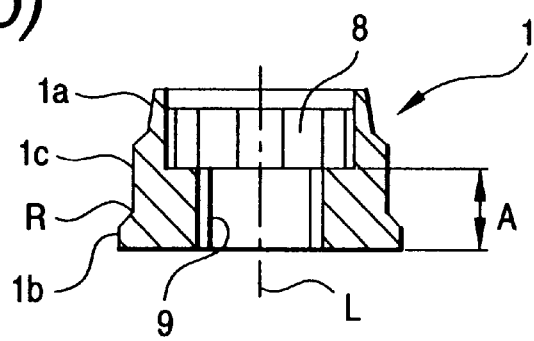

If here is used a circular washer 6 having a center hole for the tightening purpose, as shown in FIG. 4, its area to contact with the member 4 may be so sized as to prevent the member 4 from sinking. As a result, the nut body 1 can be made smaller in the bottom area of the nut body 1 and in the size than that of the case in which it is in direct contact with the member 4, as shown in FIG. 3. As shown in FIG. 5, moreover, it is preferred that a circular washer portion 1b is formed in place of the aforementioned washer 6 of FIG. 4 and integrally with the lower end portion of the nut body 1 constructing the lock nut 10. The washer portion 1b is integrated at an R portion with the nut body 1 so that the entire strength is higher than that of the case using the washer 6 of FIG. 4.

Figure 8:
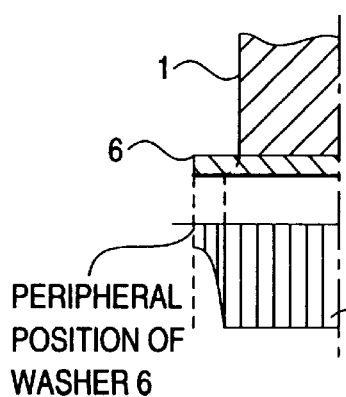
FIGS. 8A and 8B are explanatory views showing bearing pressure distributions at the members being fastened.
Figure 8:
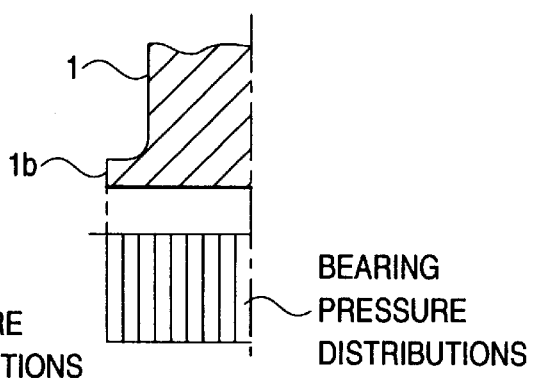

FIGS. 8A and 8B show the individual bearing pressure distributions of the type using the washer and the type having the integrally formed washer portion 1b. The lines showing the bearing pressure distributions indicate the load distributions per unit area. The bearing pressure is effectively distributed all over surface of the washer portion 1b for the integral type of FIG. 8B but is offset to the center for the washer using type of FIG. 8A. For a small size, therefore, it is desired to form the washer portion 1b integrally. In the washer using type of FIG. 8A, on the other hand, a relative displacement between the washer 6 and the nut body 1 easily occur to fluctuate the effective area of the washer 6. For a strong fastening, therefore, it is necessary to consider the size of the washer 6 used. No problem naturally arises when the washer portion 1b is integrally formed.

The nut body 1 having the washer portion 1b integrally formed at its lower end portion, as shown in FIG. 5, has such a regular hexagonal portion 1C on the upper side of the washer portion 1b as matches the outer size of nuts according to the JIS (Japanese Industrial Standards), and has the retaining portion 1a at its head portion. Inside of the nut body 1, on the other hand, there is formed a regular dodecagonal recess 8 which is located below the retaining portion 1a. Below this recess 8, there is formed a nut thread 9 with reference to the axis L of the nut body 1. This nut thread 9 has a length A of 0.6 times or more of the thread external diameter (i.e., the external diameter of the thread crest of the bolt or the external diameter of the thread root of the nut) so that the number of threads may be longitudinally retained to ensure the necessary strength.

The nut thread 9 can also be formed in the washer portion 1b so that the nut body 1 can be made accordingly lower and more compact than that of the case using the washer. The washer portion 1b has an external diameter D of two times or more of the thread external diameter and a thickness of 20% or more of that of the thread. When the external diameter D of the washer portion 1b is less than two times of that of the thread, the lower face of the lock nut 10 may sink into the member 4 to be fastened, at the time of tightening the bolt/nut. When the washer portion 1b of the lock nut 10 is thinner than 20% of the external diameter of the thread, on the other hand, it may be deformed to obstruct the reliable fastening.

Figure 6:
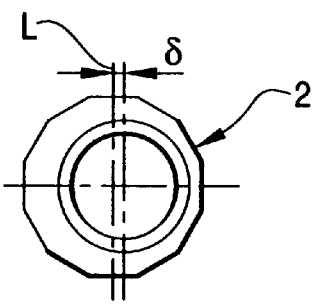
FIGS. 6A and 6B are a top plan view and a sectional view showing a construction of another eccentric thread block according to the invention.
Figure 6:
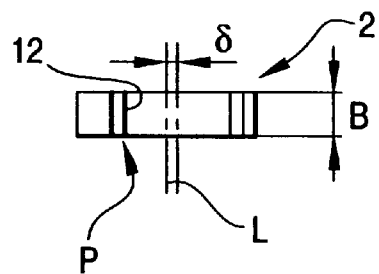

FIG. 6 shows the eccentric thread block 2, the axis of which is made eccentric by δ with respect to the axis L of the nut body 1. This eccentric thread block 2 is contoured to have such a regular dodecagonal shape as can be fitted in the regular dodecagonal recess 8 (as shown in FIG. 5) formed in the nut body 1. The eccentricity δ of the eccentric thread block 2 with respect to the axis L is preferred to be about the average clearance of the effective thread diameter plus 0.15 to 0.45 mm. Alternatively, the eccentricity δ is set to 3% or more of the external diameter of the thread. This is because the locking effect could not be achieved as in the ordinary meshing engagement if the value δ were less than 3% of the external diameter of the thread. On the other hand, the eccentric thread block 2 has a height B of two times or more of the thread pitch. This is because a necessary meshing engagement could not be achieved if the height B is less than two times of the thread pitch. Moreover, a thread portion 12, as is to engage with the thread of the bolt 3, of the eccentric thread block 2 has the chamfer P at an angle of about 45 degrees with respect to the lower face of the thread block so as to avoid the interference with the leading end of the bolt 3 at the entrance side end of the bolt.

Figure 7:
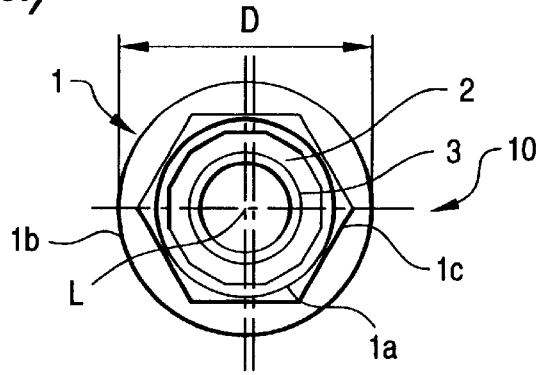
FIGS. 7A and 7B are a top plan view and a sectional view showing a construction of another nut according to the invention.
Figure 7:
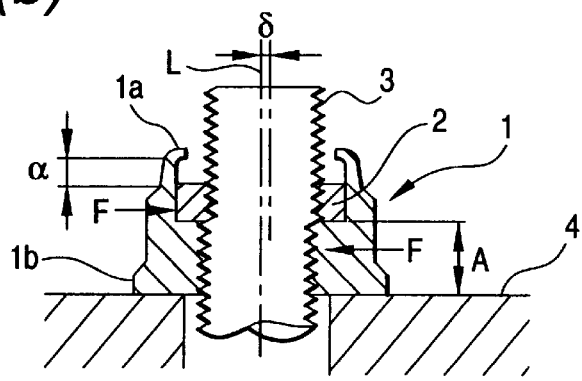

When the eccentric thread block 2 thus constructed is confined in the nut body 1, it is inserted into the recess 8 of the nut body 1 while its retaining portion 1a being inverted in advance (as indicated by phantom lines in FIG. 5B), and the retaining portion 1a is then tilted inward by caulking (or crimping ) it, as shown in FIG. 7. Between the upper face of the eccentric thread block 2 and the inclined (or tilted) portion of the retaining portion 1a, there is formed the clearance α. This clearance a provided to adjust the circumferential pitch discrepancy between the thread upper end of the nut body 1 and the thread lower end of the eccentric thread block 2, so that the gap of the thread crests can be adjusted during the upward movement of the eccentric thread block 2 thereby to force the bolt 3 through the chamfer P from below the nut thread 9.

The clearance α is made to have a value equal to or more than the pitch size of the nut body 1. This is because the bolt 3 can be tightened in the threads of the nut body 1 and the eccentric thread block 2 if the clearance α has a distance corresponding to one pitch of the nut body 1 as the minimum value. The eccentric thread block 2 is contoured to have a polygonal shape such as a hexagon or a octagon like that of the nut so that a turning force may be applied to the eccentric thread block 2 when the lock nut 10 is tightened. The case of a regular dodecagon is exemplified in the drawing 7, as described hereinbefore.

The number of polygonal sides of the eccentric thread block 2 is so selected that a necessary turning force may be established by the engagement with the regular polygon which is formed in the recess 8 inside of the nut body 1. As the side number of the polygon increases, the shape comes closer to a circle thereby providing a merit that the entire thickness of the eccentric thread block 2, and so on, can be reduced. On the contrary, there arises a demerit that a slippage may easily occur making it difficult to establish the necessary turning force. The proper side number of the polygon varies with the conditions such as the sizes or materials of the nut body 1 and the eccentric thread block 2 constructing the lock nut 10. As the sizes become larger and as the stronger materials are used, generally speaking, the size number of the polygon can be enlarged indefinitely but is properly practiced to have a value of about 6 to 12.

When the lock nut 10 thus constructed is tightened on the bolt 3, this bolt 3 comes into normal engagement with the thread of the nut body 1 but into abnormal engagement with the thread of the eccentric thread block 2. As a result, the lock nut 10 is horizontally deformed to firmly mesh with bolt 3 by the force F perpendicular to the axis of the bolt 3, as shown in FIG. 7, so that it is firmly fastened without any looseness. In other words, the tightening torque of the present lock nut is preferred to take a summation of the ordinary tightening torque and the preventing torque (i.e., resisting torque). This lock nut 10 is employed for the important portion wherein a plurality of parts subjected to vibrations have to be fastened with no looseness by the bolt 3.

Since the eccentric thread block 2 rotates integrally with the nut body 1, the eccentric thread block 2 can be tightened with the regulated torque without any problem while establishing the effect to lock the lock nut 10, even when the torque wrench is used, for example.

Figure 9:
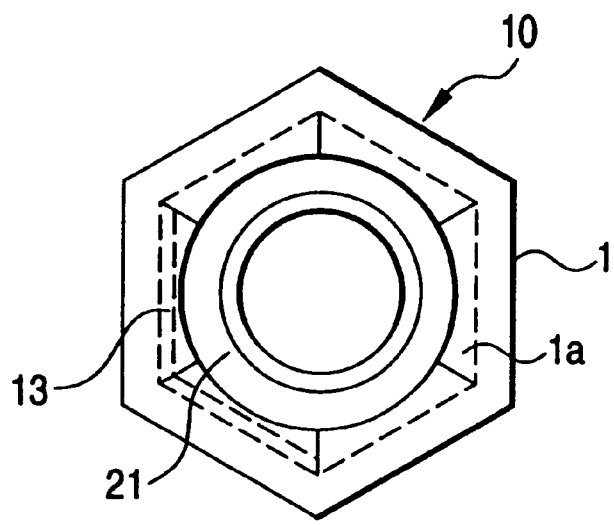
FIGS. 9A and 9B are a top plan view and a sectional view showing a construction of another set of lock nut according to the invention.
FIG. 9C is a sectional view of the thread block.
Figure 9:
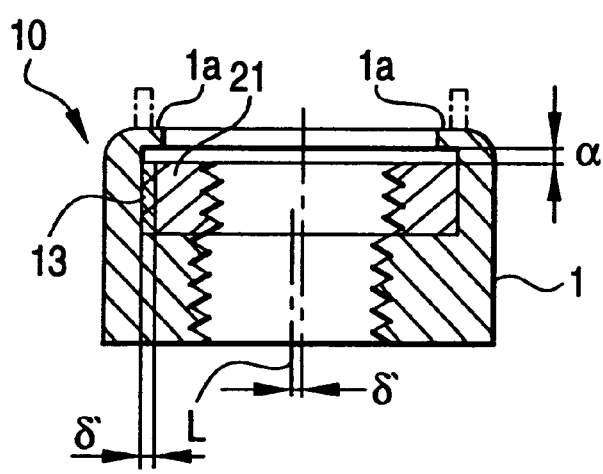
Figure 9:
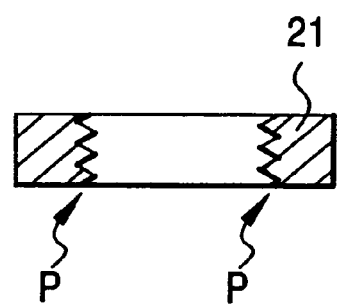

FIG. 9 shows another mode of arrangement of the eccentric thread block. A concentrically shaped thread block 21 is disposed eccentrically in the recess of the nut body 1 through an insert 13. The thickness δ' of this insert 13 can adjust the eccentricity.

Thus according to the invention, the lock nut is reliably retained on the bolt merely by tightening it and does not become loose after a long time of use.

What is claimed is:

1. A lock nut for engagement with a thread of a bolt, the lock nut comprising:

a nut body having an axis for a threaded bore, an upper portion defining a polygonally shaped recess; and at least one thread block having an axis for a threaded bore eccentric relative to the axis of the threaded bore of the nut body, the at least one thread block having a polygonal shape disposed in the polygonally shaped recess of the nut body that engages the thread of the bolt.

2. A lock nut according to claim 1, wherein the nut body includes a head portion, and further including a retaining portion disposed at the head portion, the retaining portion retains the at least one thread block.

3. A lock nut according to claim 2 wherein, the nut body has thread crests, the at least one thread block has thread crests that are separated from the thread crests of the nut body by a gap, and a clearance is defined between the retaining portion that is disposed at the head portion of said nut body and said at least one thread block the clearance enabling adjustment of the gap that separates the thread crests of said nut body and the thread crests of said at least one thread block.

4. A lock nut according to claim 1, wherein the at least one thread block includes a bolt insertion end, the bolt insertion end being chamfered.

5. A lock nut according to claim 1, further including a washer that is disposed below said nut body.

6. A lock nut accoridng to claim 1, wherein the nut body includes a lower end portion, and further including a washer portion that is formed integrally with the lower end portion.

7. A lock nut according to claim 1, further including an insert that is disposed between the nut body and the at least one thread block, the insert adjusts eccentricity of the at least one thread block relative to the axis of the nut body.

8. A lock nut according to claim 7, wherein the at least one thread block has an outer side surface that extends along the axis of the nut body, and the insert is disposed at the outer side surface.

* * * * *